United States Patent
Sarkar et al.

(10) Patent No.: US 11,014,235 B2
(45) Date of Patent: May 25, 2021

(54) SYSTEMS AND METHODS FOR SEMANTIC KNOWLEDGE BASED DYNAMIC UTILITY CALCULATION

(71) Applicant: Tata Consultancy Services Limited, Mumbai (IN)

(72) Inventors: Chayan Sarkar, Kolkata (IN); Sounak Dey, Kolkata (IN); Marichi Agarwal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 336 days.

(21) Appl. No.: 16/351,390

(22) Filed: Mar. 12, 2019

(65) Prior Publication Data
US 2020/0039071 A1    Feb. 6, 2020

(30) Foreign Application Priority Data

Jul. 31, 2018 (IN) .............................. 201821028838

(51) Int. Cl.
*B25J 9/16* (2006.01)
*B25J 9/00* (2006.01)

(52) U.S. Cl.
CPC ........... *B25J 9/1661* (2013.01); *B25J 9/0084* (2013.01); *G05B 2219/31008* (2013.01)

(58) Field of Classification Search
CPC ...... B25J 9/1661; B25J 9/0084; B25J 9/1676; B25J 9/1697; G05B 2219/31008
(Continued)

(56) References Cited

U.S. PATENT DOCUMENTS 6,374,155 B1 * 4/2002 Wallach ............... G05D 1/0274
                                                    700/245
9,821,455 B1 * 11/2017 Bareddy ................ B25J 9/1682
(Continued)

FOREIGN PATENT DOCUMENTS

CN          105069530       11/2015

OTHER PUBLICATIONS

Stenmark, M. et al. (Jun. 2015). "Knowledge-Based Instruction of Manipulation Tasks for Industrial Robotics," *Robotics and Computer-Integrated Manufacturing*, vol. 33; pp. 56-67.
(Continued)

*Primary Examiner* — Dalena Tran
(74) *Attorney, Agent, or Firm* — Finnegan, Henderson, Farabow, Garrett & Dunner, L.L.P.

(57) ABSTRACT

Parameters specific to robot, environment, target objects and their inter-relations need to be considered by a robot to estimate cost of a task. As the existing task allocation methods assume a single utility value for a robot-task pair, combining heterogeneous parameters is a challenge. In applications like search and rescue, manual intervention may not be possible in real time. For such cases, utility calculation may be a hindrance towards automation. Also, manufacturers follow their own nomenclature and units for robotic specifications. Only domain experts can identify semantically similar terms and perform necessary conversions. Systems and methods of the present disclosure provide a structured semantic knowledge model to store and describe data in a uniform machine readable format such that semantics of those data can be interpreted by the robots and utility computation can be autonomous to make task allocation autonomous, semantic enabled and capable of self-decision without human intervention.

20 Claims, 8 Drawing Sheets

(58) Field of Classification Search
USPC ....... 700/245, 248, 246; 701/23, 24, 26, 301
See application file for complete search history.

(56) References Cited

U.S. PATENT DOCUMENTS

| | | | |
|---|---|---|---|
| 10,500,717 B2* | 12/2019 | Stilwell | B25J 9/0084 |
| 2017/0023937 A1* | 1/2017 | Loianno | G08G 5/0034 |
| 2018/0266247 A1* | 9/2018 | Lundh | G06Q 50/02 |
| 2018/0316628 A1 | 11/2018 | Day et al. | |

OTHER PUBLICATIONS

Sadik, A.R. et al. (Nov. 2017). "An Ontology-Based Approach to Enable Knowledge Representation and Reasoning in Worker-Cobot Agile Manufacturing," *Future Internet 2017*, vol. 9, No. 4; pp. 1-23.

* cited by examiner

SYSTEMS AND METHODS FOR SEMANTIC KNOWLEDGE BASED DYNAMIC UTILITY CALCULATION

PRIORITY CLAIM

This U.S. patent application claims priority under 35 U.S.C. § 119 to: Indian Patent Application No. 201821028838, filed on 31$^{st}$ Jul., 2018. The entire contents of the aforementioned application are incorporated herein by reference.

TECHNICAL FIELD

The disclosure herein generally relates to multi-robot task allocation, and, more particularly, to systems and methods for semantic knowledge based dynamic utility calculation for the task allocation.

BACKGROUND

Mobile robots are a convenient tool to perform a set of tasks efficiently with minimal human intervention. Deploying a team of robots is often beneficial as opposed to a single robot. Among others, efficiency of such a collaborative exploration depends largely on efficient multi-robot task allocation (MRTA), which has gained significant research attention due to its diverse range of applications. An objective is to allocate tasks to robotic agents either instantaneously or in a time-extended fashion such that an overall goal can be achieved with minimal completion cost and/or time. A precursor to the task assignment with such an objective is to perform utility calculation. It generally refers to accurately estimating the cost of a particular task, if performed by a particular robot. This cost estimation helps to schedule and assign the tasks among the fleet of robots such that the overall cost to perform all the tasks can be minimized.

SUMMARY

Embodiments of the present disclosure present technological improvements as solutions to one or more of the above-mentioned technical problems recognized by the inventors in conventional systems.

In an aspect, there is provided a processor implemented method for performing a model driven domain specific search comprising: obtaining, by one or more hardware processors, a set of parameters for each robot-task pair to perform a task, given there are n tasks to be performed by k robots, wherein the set of parameters are characterized by interdependencies therebetween, with a set of sub-parameters and with the n tasks, and wherein a one-to-many mapping between the set of parameters, the set of sub-parameters and the n tasks is defined in real time in a structured semantic knowledge model; and dynamically computing, by the one or more hardware processors, utility for a robot i to perform a task j based on the set of parameters including travel time for the robot i and actuation time for the task j by the robot i, wherein the travel time is further based on free motion time and turning time, wherein the free motion time depends on travel distance and speed of the robot $v_i$ and the turning time depends on average turning time and number of turns on the robot's path.

In another aspect, there is provided a system comprising: one or more data storage devices operatively coupled to the one or more processors and configured to store instructions configured for execution by the one or more processors to: obtain a set of parameters for each robot-task pair to perform a task, given there are n tasks to be performed by k robots, wherein the set of parameters are characterized by interdependencies therebetween, with a set of sub-parameters and with the n tasks, and wherein a one-to-many mapping between the set of parameters, the set of sub-parameters and the n tasks is defined in real time in a structured semantic knowledge model; and dynamically compute utility for a robot i to perform a task j based on the set of parameters including travel time for the robot i and actuation time for the task j by the robot i, wherein the travel time is further based on free motion time and turning time, wherein the free motion time depends on travel distance and speed of the robot $v_i$ and the turning time depends on average turning time and number of turns on the robot's path.

In yet another aspect, there is provided a computer program product comprising a non-transitory computer readable medium having a computer readable program embodied therein, wherein the computer readable program, when executed on a computing device, causes the computing device to: obtain a set of parameters for each robot-task pair to perform a task, given there are n tasks to be performed by k robots, wherein the set of parameters are characterized by interdependencies therebetween, with a set of sub-parameters and with the n tasks, and wherein a one-to-many mapping between the set of parameters, the set of sub-parameters and the n tasks is defined in real time in a structured semantic knowledge model; and dynamically compute utility for a robot i to perform a task j based on the set of parameters including travel time for the robot i and actuation time for the task j by the robot i, wherein the travel time is further based on free motion time and turning time, wherein the free motion time depends on travel distance and speed of the robot $v_i$ and the turning time depends on average turning time and number of turns on the robot's path.

In an embodiment of the present disclosure, the one or more processors are further configured to dynamically compute the utility based on restrictions or limitations that exist or need to be satisfied based on the structured semantic knowledge model.

In an embodiment of the present disclosure, the one or more processors are further configured to: identify capability of each robot from the k robots to perform the task j based on at least one of the structured semantic knowledge model and the dynamically computed utility; store values associated with the utility for each of the k robots along with the identified capability associated thereof in a matrix as the robot-task pair; input the matrix to a task allocation method; and update the one-to-many mapping between the set of parameters, the set of sub-parameters and the n tasks based on an output of the task allocation method.

In an embodiment of the present disclosure, the turning time represents ascending or descending time to reach a desired flight level if the robot is an unmanned aerial vehicle (UAV).

In an embodiment of the present disclosure, the one or more hardware processors are further configured to compute the utility for a robot i further based on recharge time for the robot i.

In an embodiment of the present disclosure, the recharge time is an equivalent time to recharge battery of the robot that is spent to perform the task j and is based on an estimated amount of energy spent by the robot to perform sub-tasks that in combination completes the task j, total time required to recharge the battery fully from a completely drained out state and total battery capacity of the robot.

In an embodiment of the present disclosure, the estimated amount of energy is based on at least some energy consuming activities including energy spent for movement activities, energy spent on sensing activities, energy spent for actuation activities, energy spent on load carrying activities, energy spent on computation activities, energy spent on communication activities, and energy spent on miscellaneous activities.

In an embodiment of the present disclosure, the energy spent on the energy consuming activities is based on an energy consumption rate associated thereof and time taken for performing the corresponding energy consuming activities.

In an embodiment of the present disclosure, the structured semantic knowledge model is an ontology created in Web Ontology Language (OWL) with a semantic knowledge repository based on Resource Description Framework (RDF), wherein the semantic knowledge repository has a generic modular structure comprising (i) components and capabilities associated with each of the k robots represented as a robot ontology, (ii) description of objects comprised in an environment under consideration represented as an object ontology and (iii) an environment model corresponding to the environment under consideration represented as an environment ontology, wherein an instance of each of the ontologies is populated corresponding to the environment under consideration.

In an embodiment of the present disclosure, the one or more hardware processors are further configured to compute the utility by analyzing semantics of the set of parameters, wherein parameters thereof are heterogeneous.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
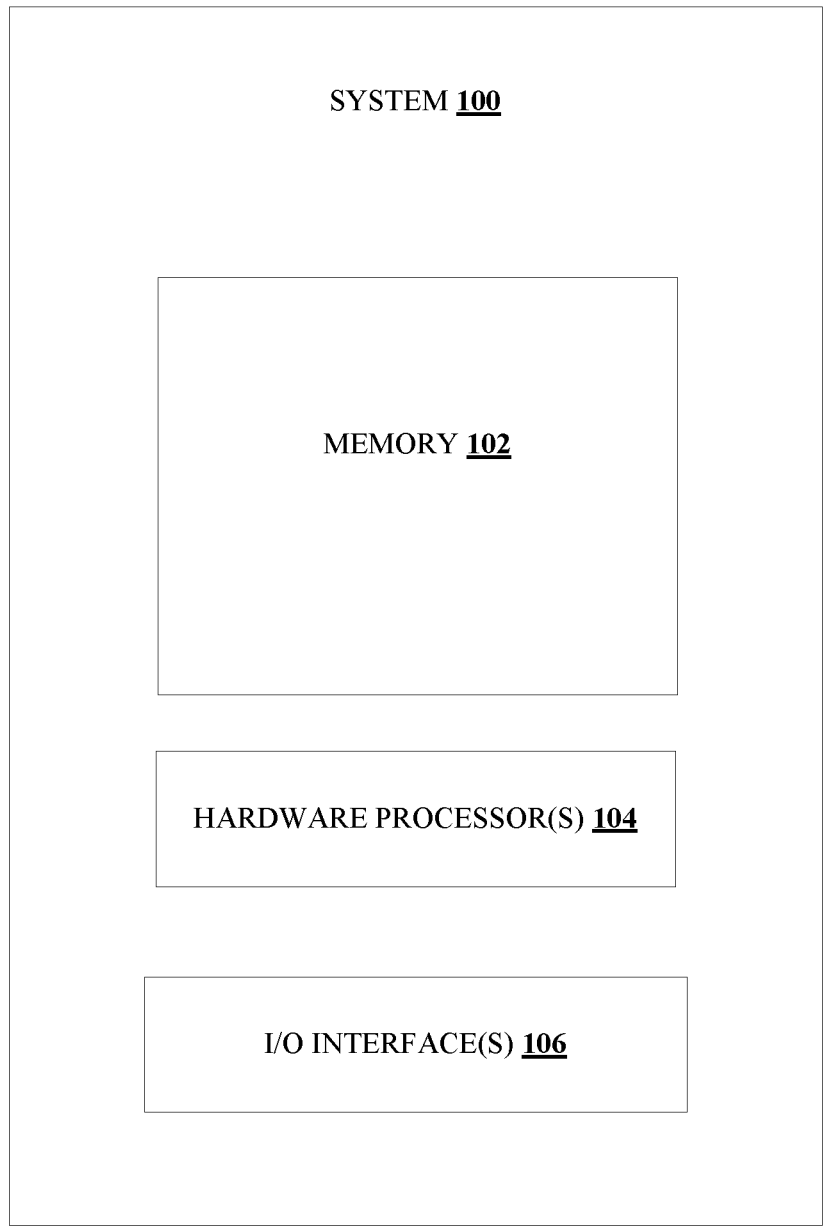
FIG. 1 illustrates an exemplary block diagram of a system for semantic knowledge based dynamic utility calculation, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Industry 4.0 standard proposes autonomy of robotic agents that are capable of coordinating amongst themselves, do inferencing, and take a decision on their own with minimal human intervention. Employing a team of robots within a factory floor or a warehouse is quite prevalent today as robots can perform a known task with higher accuracy and efficiency if its capability permits. Efficiency and throughput of such a setup depend on careful task assignment and scheduling, which further depend on utility calculation. Though a number of techniques exist to perform efficient task allocation, they assume the utility values are available and static. They neither consider all the parameters nor the dynamic changes that may occur during task execution. Moreover, methods of automating such dynamic utility calculation (both at the start and at runtime) may be a hindrance to building a fully automated robotic workforce.

If all the robots are homogeneous and cost of performing a task is equivalent to the time required to complete the task, the utility calculation becomes trivial. However, in practice, it is a far more complex process and needs to consider a number of factors such as:

Parameters specific to robot, environment, target object, etc., and their inter-relations need to be considered by a robot to estimate the cost of a task. As the existing task allocation methods assume a single utility value for a robot-task pair, combining heterogeneous parameters makes it a difficult task.

Scenarios like "search and rescue" where manual control or supervision may not be possible in real time, robots may have to take a decision by themselves at runtime. For such cases, utility calculation may be a hindrance towards automation.

Usually manufacturers follow their own nomenclature and units for robotic specifications. Only domain experts can identify semantically similar terms and do necessary conversions.

Even if the robots are of the same type, value of certain parameters vary over time, e.g., battery state, current location, remaining weight carrying capacity (the robot may be already carrying some objects), etc. These need to be considered in runtime during dynamic task allocation.

In the present disclosure, firstly methods to calculate utility for heterogeneous (as well as homogeneous) team of robots under a dynamic scenario are provided. Secondly, a structured semantic knowledge model data is provided in a uniform machine readable format such that semantics of data can be interpreted by the robots for automated utility calculation and task allocation.

Referring now to the drawings, and more particularly to FIG. 1 through FIG. 4 where similar reference characters denote corresponding features consistently throughout the figures, there are shown preferred embodiments and these embodiments are described in the context of the following exemplary system and/or method.

FIG. 1 illustrates an exemplary block diagram of a system 100 for semantic knowledge based dynamic utility calculation in accordance with an embodiment of the present disclosure. In an embodiment, the system 100 includes one or more processors 104, communication interface device(s)

or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2A:
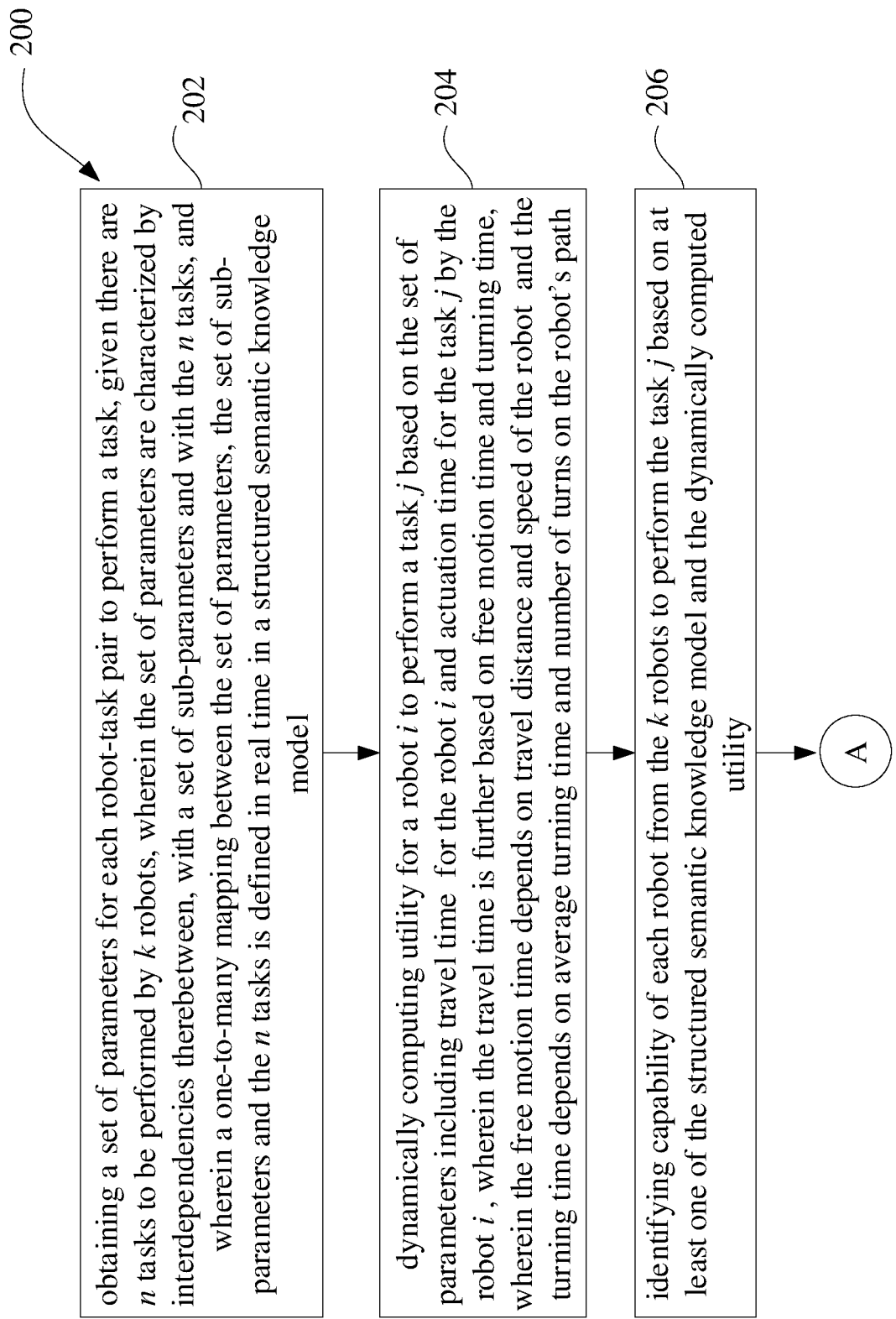
FIG. 2A through FIG. 2B illustrates an exemplary flow diagram for semantic knowledge based dynamic utility calculation, in accordance with an embodiment of the present disclosure.
Figure 2B:
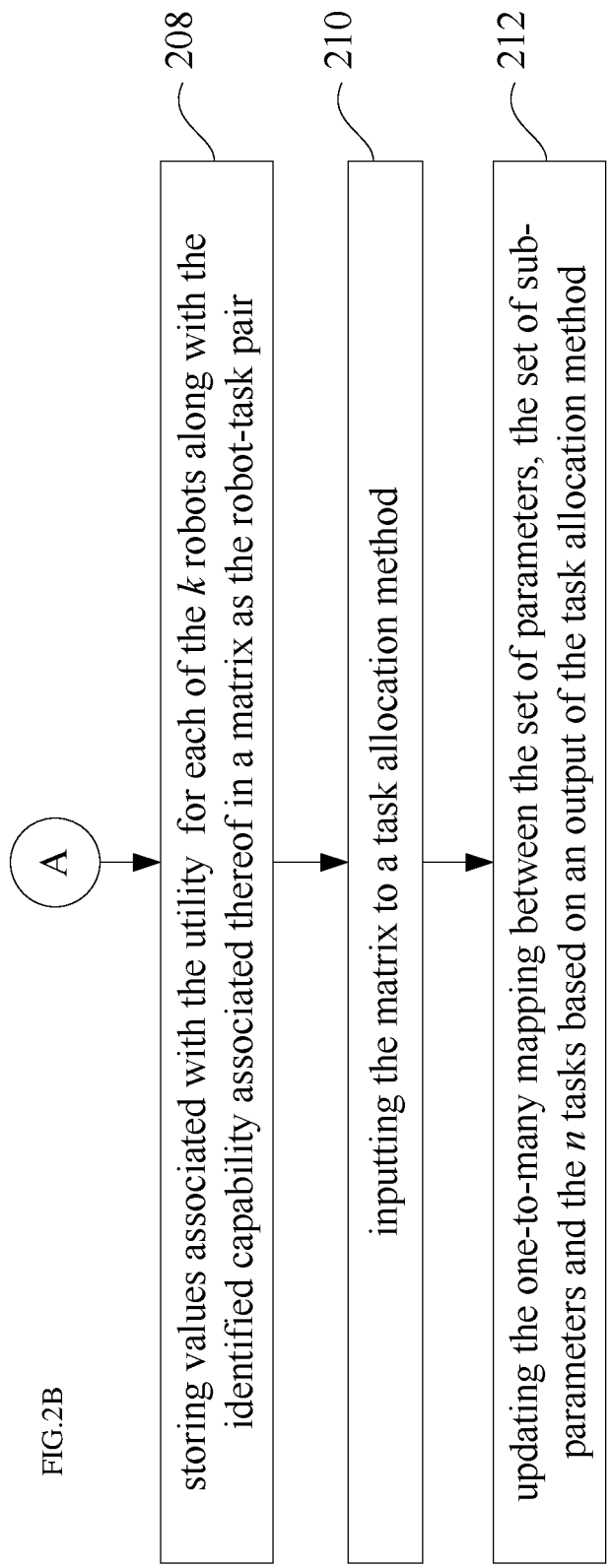

FIG. 2A through FIG. 2B illustrates an exemplary flow diagram for a computer implemented method 200 for semantic knowledge based dynamic utility calculation, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Suppose a multi-robot system comprises a fleet of k robots and currently there are n tasks to be performed by them. In an embodiment of the present disclosure, the one or more processors 104 are configured to obtain, at step 202, a set of parameters for each robot-task pair to perform a task, given there are n tasks to be performed by k robots. In accordance with the present disclosure, a k×n matrix is generated for each robot-task pair that can be provided as an input to a task allocation method. The set of parameters are characterized by interdependencies between them, with a set of sub-parameters and with the n tasks. In accordance with the present disclosure, a one-to-many mapping between the set of parameters, the set of sub-parameters and the n tasks is defined real time in a structured semantic knowledge model described hereinafter.

In accordance with an embodiment of the present disclosure, the one or more processors 104 are configured to dynamically compute, at step 204, utility $u_{ij}$ for a robot i to perform a task j based on the set of parameters obtained at step 202. In an embodiment, the set of parameters may include travel time $t_{ij}^{motion}$ for the robot i and actuation time $t_{ij}^{act}$ for the task j by the robot i. In an embodiment, the step of computing utility $u_{ij}$ for a robot i may further be based on recharge time $t_{ij}^{rec}$ the robot i. If the robot's battery is replaceable, $t_{ij}^{rec}$ may be ignored and the recharge time $t_{ij}^{rec}$ may be replaced with a fixed battery replace time. In accordance with the present disclosure, for robot i, the utility (cost) to perform task j may be calculated using the following equation, $$u_{ij} = t_{ij}^{motion} + t_{ij}^{act} + t_{ij}^{rec} \rightarrow \qquad (1)$$

Motion of a robot consists of straight line motion and rotation. Therefore, in accordance with an embodiment of the present disclosure, the travel time $t_{ij}^{motion}$ is based on straight line motion or free motion time $t_{ij}^{free}$ and turning time $t_{ij}^{turn}$, wherein the free motion time $t_{ij}^{free}$ depends on travel distance $d_{ij}^{free}$ and speed of the robot $v_i$. Again the turning time $t_{ij}^{turn}$ depends on average turning time $t_i^{turn}$ and number of turns $n_{ij}^{turn}$ the robot's path. In an embodiment, the turning time $t_{ij}^{turn}$ represents ascending or descending time to reach a desired flight level if the robot is an unmanned aerial vehicle (UAV). The actuation time $t_{ij}^{act}$ is the time the robot spends to perform something with respect to the task other than the movement. For example, picking time for a particular type of object by the robot. This is usually a static value with certain defined variation for a particular robot-task pair. Accordingly, $t_{ij}^{motion}$, $t_{ij}^{free}$ and $t_i^{turn}$ of the present disclosure may be represented as follows:

$$t_{ij}^{motion} = t_{ij}^{free} + t_{ij}^{turn} \qquad (2)$$

$$\text{wherein } t_{ij}^{free} = \frac{d_{ij}^{free}}{v_i} \text{ and}$$

$$t_{ij}^{turn} = t_i^{turn} * n_{ij}^{turn}$$

As stated herein above, the recharge time $t_{ij}^{rec}$ is an equivalent time to recharge the robot's battery that it spends to perform the task. In accordance with an embodiment of the present disclosure, the recharge time $t_{ij}^{rec}$ may be represented as follows:

$$t_{ij}^{rec} = \frac{e_{ij}}{e_i^{cap}} * t_i^{cap} \qquad (3)$$

wherein $e_{ij}$ represents an estimated amount of energy $e_{ij}$ spent by the robot to perform sub-tasks that in combination completes the task j, $t_i^{cap}$ represents total time required to recharge the battery fully from a completely drained out state and $e_i^{cap}$ represents total battery capacity of the robot. Thus, $t_{ij}^{rec}$ provides a rough estimate of the fraction of time to recharge the equivalent energy spending. However, battery recharge time does not follow a linear timeline. Thus, equation (3) may be modified accordingly, if $e_{ij}$ is estimated accurately.

The estimated amount of energy $e_{ij}$ depends on various energy consuming activities such as motion, sensing, actuation, load carrying, computation, communication and miscellaneous activities. Accordingly, the estimated amount of energy $e_{ij}$ is based on at least some energy consuming activities including energy spent for movement activities $e_{ij}^{motion}$, energy spent on sensing activities $e_{ij}^{sense}$, energy spent for actuation activities $e_{ij}^{act}$, energy spent on load carrying activities $e_{ij}^{load}$, energy spent on computation activities $e_{ij}^{comp}$, energy spent on communication activities $e_{ij}^{comm}$, and energy spent on miscellaneous activities $e_{ij}^{misc}$ and may be represented as follows:

$$e_{ij} = e_{ij}^{motion} + e_{ij}^{sense} + e_{ij}^{act} + e_{ij}^{load} + e_{ij}^{comp} + e_{ij}^{misc} \rightarrow \quad (4)$$

In accordance with the present disclosure, the energy spent on the energy consuming activities is based on an energy consumption rate $p_i$ associated with the activities and time taken for performing the corresponding energy consuming activities and may be represented as follows:

$$e_{ij}^{motion} = p_i^{motion} * t_{ij}^{motion}$$

$$e_{ij}^{sense} = p_i^{sense} * t_{ij}^{sense}$$

$$e_{ij}^{act} = p_i^{act} * t_{ij}^{act}$$

$$e_{ij}^{load} = p_i^{load} * t_{ij}^{load}$$

$$e_{ij}^{comp} = p_i^{comp} * t_{ij}^{comp}$$

$$e_{ij}^{comm} = p_i^{comm} * t_{ij}^{comm}$$

Accordingly, the energy spent for movement activities $e_{ij}^{motion}$ depends on the energy consumption rate for motion $p_i^{motion}$ and time to be spent by the robot for motion $t_{ij}^{motion}$. Again, the motion time of the robot depends on the task, but the energy consumption rate of the robot is independent of the task. Similarly, in accordance with the present disclosure, sensing, actuation, load, computation, and communication energy spending is calculated where even though the time for each activity is dependent on the task; but the energy consumption rate for each of these activities is independent of the task.

In order to complete a broad set of tasks on their team, a team of robots requires domain knowledge available either locally or in cloud in some machine readable and machine interpretable format. In accordance with the present disclosure relevant concepts from domains like environment, task, robot capabilities, robot components, target objects, dynamic values of robot parameters, etc., and their inter-relation, dependencies, constraints are captured in a structured semantic knowledge model.

Robotic tasks like picking, placing, moving, lifting, surveying and the like from different domains depend on a set of parameters like weight of the target object, location of the target, the size of the area under surveillance and the like. However, not all tasks involve all the parameters that are required for utility calculation. For example, surveying an area does not need weight of the object while picking task does not involve size of an area. For the first level of automation, the robots need to know the required parameters for a given task. Thus, for a global set of tasks say, $\{T_1, T_2, T_3, T_4, \ldots, T_n\}$ and a global set of parameters say, $\{P_1, P_2, P_3, P_4, \ldots, P_m\}$, there has to be a well-defined one-to-many mapping between elements of task set and parameter set. In accordance with the present disclosure, the structured semantic knowledge model is configured to capture such task vs. parameter dependencies so that robots can query to know which parameters to consider against a given task. This is the first role of the semantic knowledge model for automated robotic utility calculation. These parameters often depend on features of robots, environment and other domain specific parameters. For instance, in an example of a warehouse specific task like: "Pick a box of apple and place it at storage rack no. 3 in aisle no. 4", for utility calculation as per equation (1), data like travel time to reach the box, time required to pick up the box, travel time to the storage rack, energy spent during these travelling/picking/storing, etc. are needed. But these data are not directly calculable as they are dependent on a set of sub-parameters and their inter-relations. For example, the travel time depends upon the distance between the box and the current location of the robot running cost of the path-planning methods, number of turns to be taken during navigation, speed of the mobile robot, etc. Similarly, picking up the box depends upon weight and size of the box, fragility level of the box, computation cost for box identification, computation cost for pickup actuation, energy required for gripping/picking, etc. Finally, to bring the picked-up box to its destination, various parameters like, height of rack no. 3, distance between aisle no. 4 and the box's current location, present load carrying capacity and battery level of the robot, battery recharge time/battery swap time, etc. are also need to be considered. Therefore, in accordance with the present disclosure, the semantic knowledge model captures the interdependencies between the parameters and the sub-parameters as well along with the tasks.

Again, the parameters are not always specified in a uniform fashion by different manufacturers. For example, speed of a mobile robot is mentioned in miles per hour (MPH) for some robots while meter per second (m/s) is used for others. Moreover, some manufacturers mention number of wheel rotations per second instead of specifying speed. Thus one needs wheel diameter to calculate the speed in such cases. If the above mentioned task of picking a box of apple is assigned to a heterogeneous team of robots, then, in order to calculate the time required to reach to a height of say, 5 meters (height of rack 3), average reaching speed of the arm in case of a ground moving robot or ascending speed in case of an aerial robot needs to be considered. Without knowing that these two parameters are semantically similar, there is no way that a system can autonomously calculate utility. In accordance with the present disclosure, the step 204 of dynamically computing utility $u_{ij}$ comprises analyzing semantics of the set of parameters, wherein the parameters may be heterogeneous for a heterogeneous set of robots, thereby solving these issues semantically for uniform comparison and utility calculation.

In accordance with an embodiment of the present disclosure, the structured semantic knowledge model is an ontology created in Web Ontology Language (OWL) with a semantic knowledge repository based on Resource Description Framework (RDF). In accordance with the present disclosure, the semantic knowledge repository has a generic modular structure comprising (i) components and capabilities associated with each of the k robots represented as a robot ontology (FIG. 3A), (ii) description of objects comprised in an environment under consideration represented as an object ontology (FIG. 3C) and (iii) an environment model corresponding to the environment under consideration represented as an environment ontology (FIG. 3B), wherein an instance of each of the ontologies are populated corresponding to the environment under consideration.

Figure 3A:
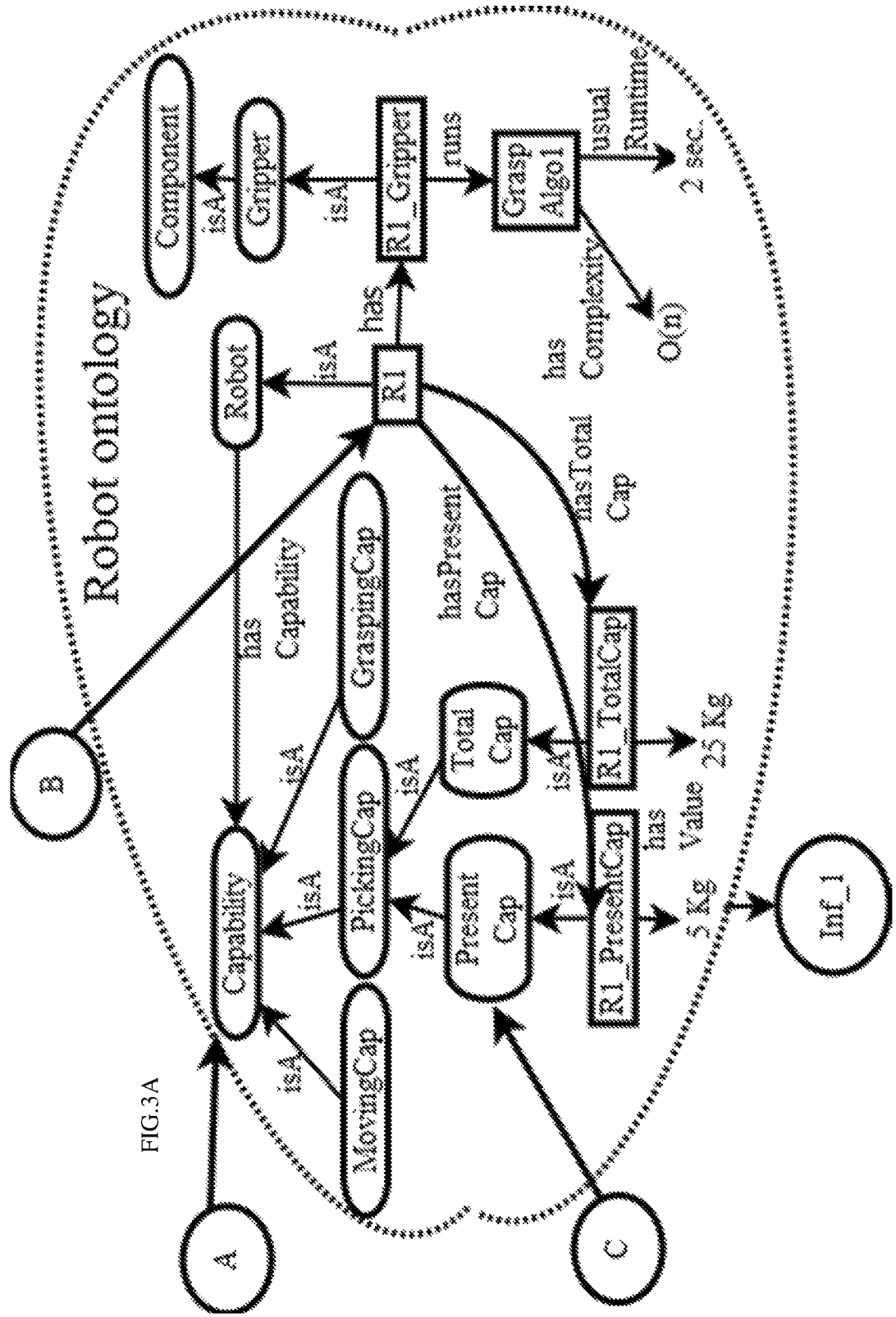
FIG. 3A through FIG. 3D provides a representation of a generic modular structure of a semantic knowledge model in accordance with an embodiment of the present disclosure.
Figure 3B:
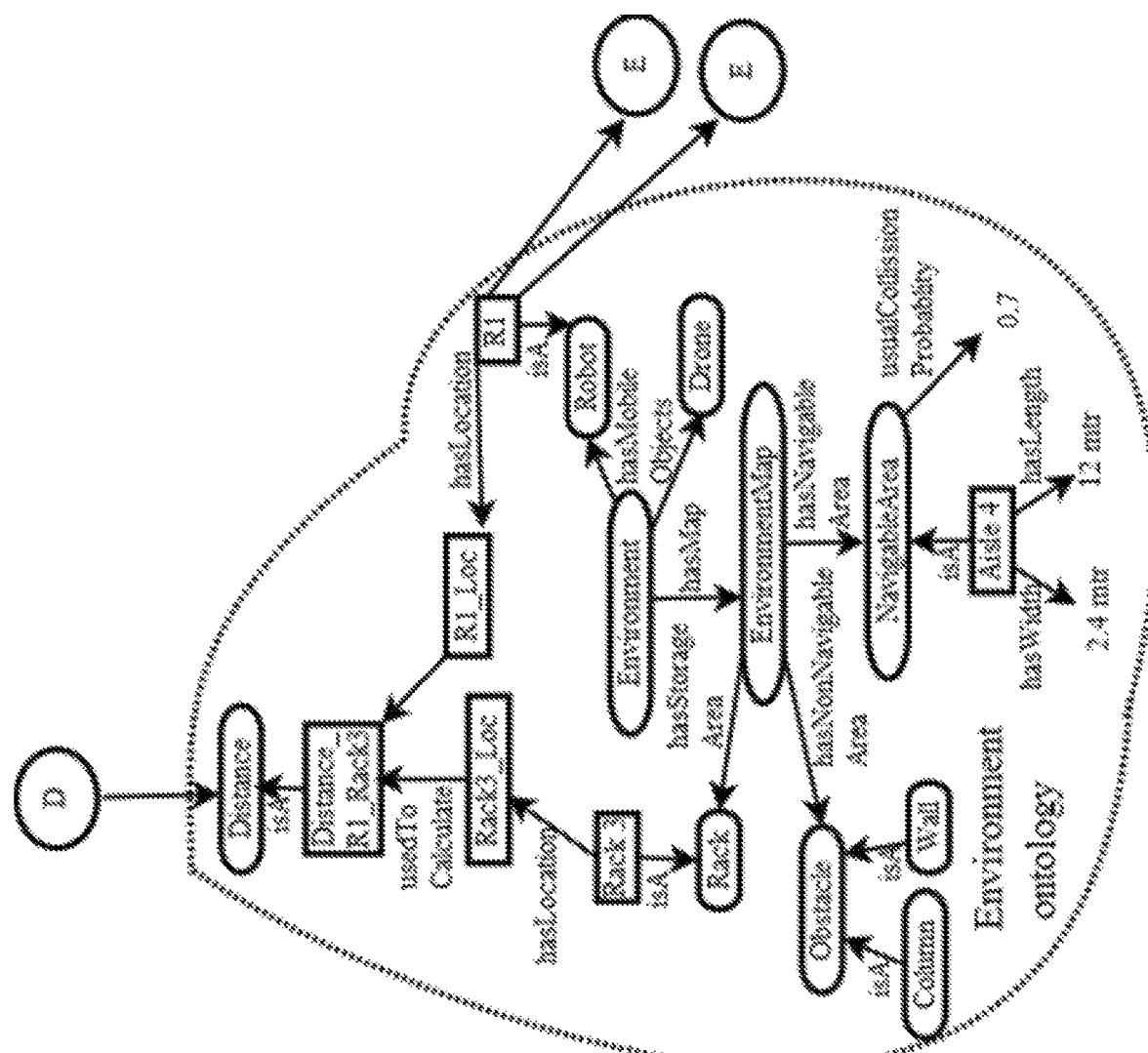
Figure 3C:
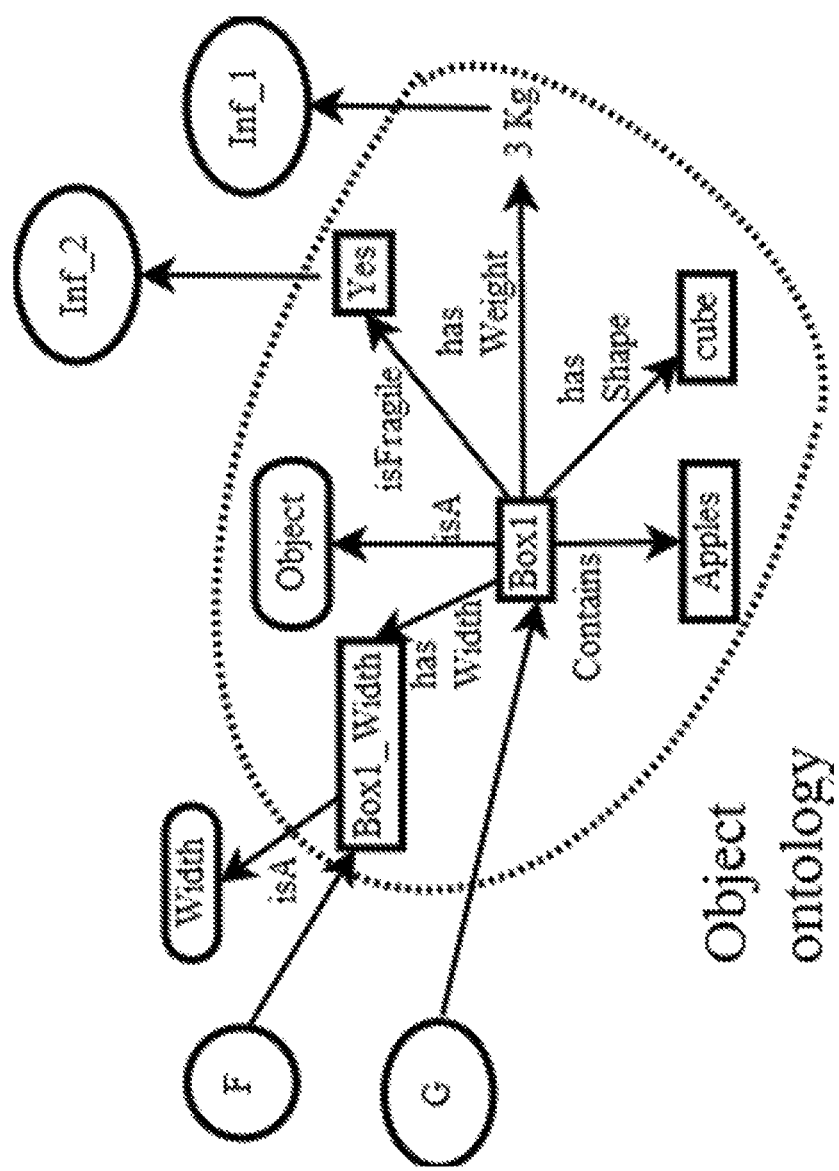
Figure 3D:
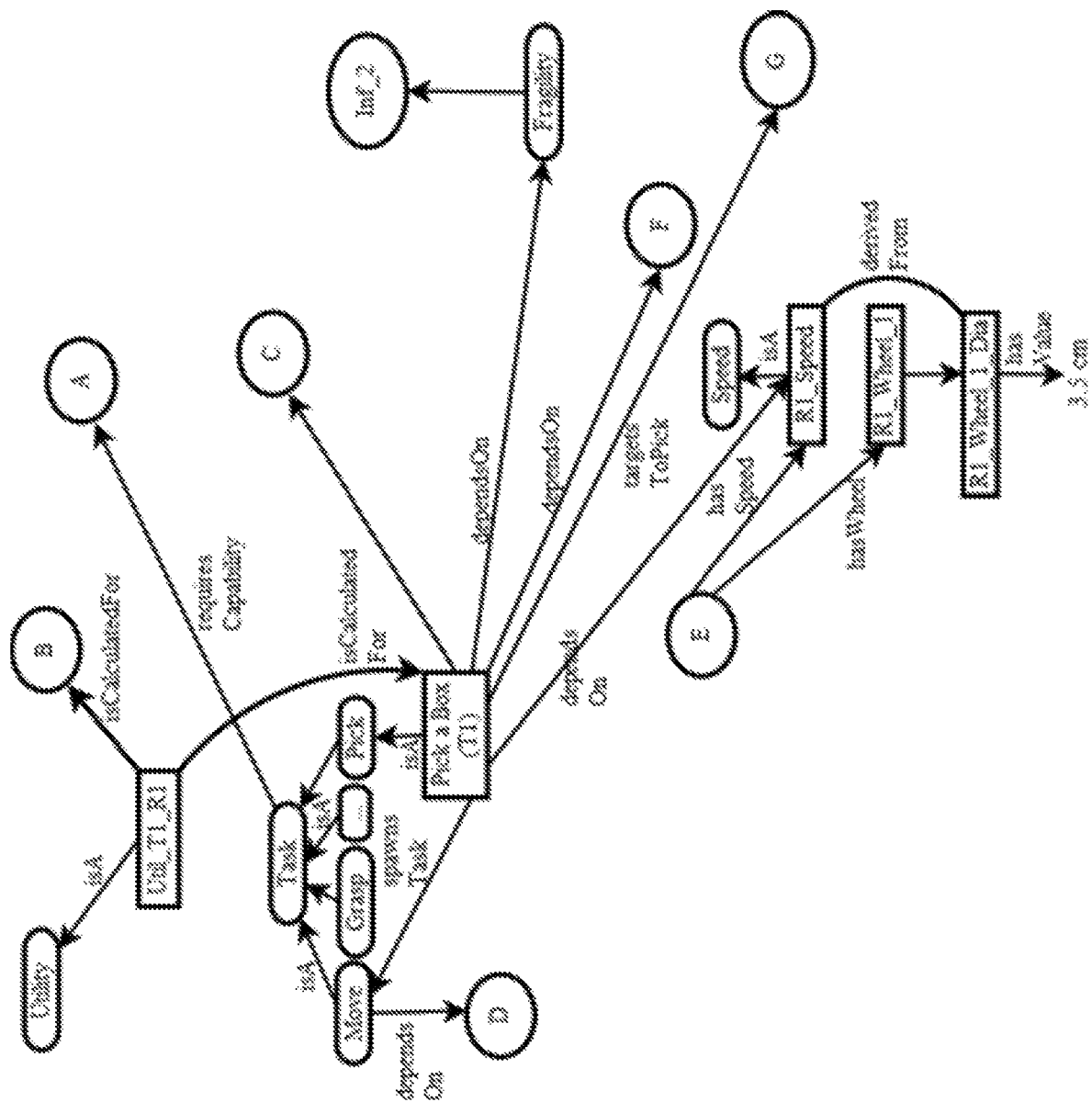

FIG. 3A through FIG. 3D provides a representation of a generic modular structure of a semantic knowledge model in accordance with an embodiment of the present disclosure, wherein the concepts and relations around the robotic entity may be captured in robot.owl while environment.owl may capture the same for the environment where the task is being executed. Relationships between the parameters and sub-parameters are seen as a graph where the edges carry meaningful information about data and their relationships. Utility calculation is made autonomous by the semantic knowledge model configured to understand exact semantics of the task and identifying a capable robot to handle the task in an optimized manner. In traditional relational databases, the stored data needs to be re-worked when new relationships are discovered before any inferencing can be made. Such re-work is averted by the ontology of the present disclosure. Again, the modular structure facilitates adapting the semantic knowledge model to various environments easily. In the illustration provided, FIG. 3A illustrates the robot ontology, FIG. 3B illustrates the environment ontology, FIG. 3C illustrates the object ontology and FIG. 3D illustrates the external links between the ontologies comprising a basic framework. For instance, if a warehouse environment has to be replaced by say a factory environment or a hospital environment, in accordance with the present disclosure, the environment ontology depicted in FIG. 3B only needs to be modified. The basic framework of the semantic knowledge model remains constant while the relevant ontologies undergo required modifications.

In accordance with an embodiment of the present disclosure, the one or more processors 104 are configured to identify, at step 206, capability of each robot from the k robots to perform the task j based on at least one of the structured semantic knowledge model and the dynamically computed utility. At step 208, values associated with the utility $u_{ij}$ for each of the k robots along with the identified capability of the associated robot are stored in a matrix as the robot-task pair which are further input to a task allocation method at step 210 for assigning tasks to the robots having the capability to perform the task j. Based on an outcome of the task allocation method, tasks may be identified to at least some of the k robots. Accordingly, the one or more processors 104 are further configured to update, at step 212, the one-to-many mapping between the set of parameters, the set of sub-parameters and the n tasks based on the output of the task allocation method. It may be noted that the real time updated semantic knowledge model makes the system 100 of the present disclosure autonomous, semantic enabled and capable of self-decision without human intervention.

To interact with the ontology and related database, an API interface has been created based on RDFLib, a Python™ library for working with RDF. Some example APIs include: findRequiredHWcapability(task), findObjectDetails(object), getRackPos(rack #), retrieveRobotDetails(task, robot), etc. A sample output of the API retrieveRobotDetails(task T1, robot R1), which provides parameter values of the Robot-1 (R1) with respect to the task T1 may be as shown below.
calling . . . retrieveRobotDetails(T1,R1):
Details for Task—T1 and Robot—R1 may be as represented as shown in Table 1 below:

TABLE 1

| Specifications | Data | Constraints | Values |
|---|---|---|---|
| Distance (m) | 100 | Residual energy | 10000 |
| No. of turns | 4 | Required energy | 8293.69 |
| Average velocity (m/s) | 0.65 | | |
| Turning time for 1.5708 rad (s) | 5 | | |
| Sense, compute and motion energy (without load) (J/s) | 21.6 | | |
| Sense, compute and motion energy (with load) (J/s) | 23.6 | | |

TABLE 1-continued

| Specifications | Data | Constraints | Values |
|---|---|---|---|
| Actuation energy (J/s) | 1.2 | | |
| Communication energy (J/s) | 2.3 | | |

Similar details may be obtained for other robots (say, Robot-R2, Robot-R3, etc.) for the same task and utility for each of the robots maybe calculated using the values as detailed in an exemplary table 2 below:

TABLE 2

Sample utility calculation for three robots w.r.t a task.

| Specifications | Robot - R1 | Robot - R2 | Robot - R3 |
|---|---|---|---|
| Distance (m) | 100 | 150 | 70 |
| No. of turns | 4 | 2 | 7 |
| Average velocity (m/s) | 0.65 | 0.68 | 0.65 |
| Turning time for 1.5708 rad (s) | 5 | 5 | 4 |
| Sense, compute and motion energy (without load) (J/s) | 21.6 | 21.9 | 22.3 |
| Sense, compute and motion energy (with load) (J/s) | 23.6 | 24.7 | 25.1 |
| Actuation energy (J/s) | 1.2 | 1.05 | ∞ |
| Communication energy (J/s) | 2.3 | 2.25 | 2.1 |
| Energy Required/Residue (KJ) | 8.3/10 | 11.3/5 | ∞/9 |
| Recommendation | YES | NO | NO |

It is noted that the energy required for Robot—R3 is incalculable as its actuation energy is undefined. This is because it does not have the picker arm and hence does not have the capability to pick the box. Similarly, Robot—R2 needs 11.3 KJ to complete the task which is higher than the residue energy (5KJ). Hence Robot—R1 is the only robot capable and hence recommended for the task. Thus the structured semantic knowledge model of the present disclosure, helps in utility calculation by supplying certain restrictions or limitations that are there or needs to be satisfied and thereby identifying capable robots. In another example, if the turning radius of a robot/drone is found to be one meter while the aisle width (found from an associated warehouse map) is 0.8 m then the robot is not capable of doing the task at all and hence no utility calculation is done for it against this task.

Figure 4:
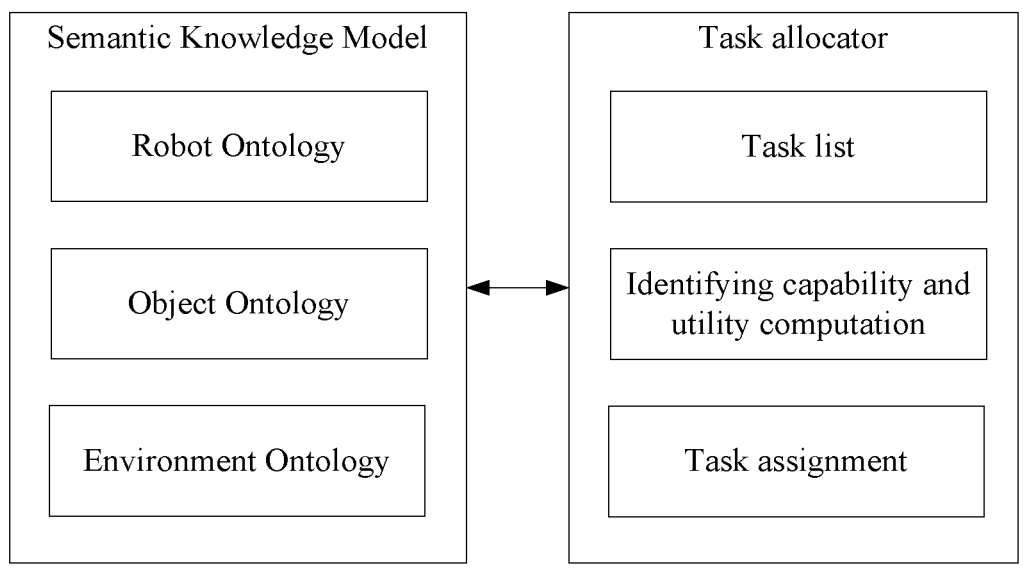
FIG. 4 provides a schematic representation of an interaction between a task allocator and a semantic knowledge model, in accordance with an embodiment of the present disclosure.

FIG. 4 provides a schematic representation of an interaction between a task allocator and a semantic knowledge model, in accordance with an embodiment of the present disclosure. The goal of utility calculation for multi-robot task allocation (MRTA) is to provide the necessary and sufficient information to the task allocator such that it can allocate the tasks with minimum execution cost. The task allocator is assigned a task list of given or discovered tasks with relevant description. For each task, the task allocator consults the semantic knowledge model to compute the utility values for all the available robots. The semantic knowledge model facilitates dynamic and automated utility calculation with no human intervention. The accuracy of the utility calculation is also high since it is dynamically calculated based on real time status of the robots. The three major components of the knowledge base that are required for utility calculation are shown in FIG. 4. Each of these components is represented using an ontology and an instance of these ontologies are populated with the relevant data for a particular environment. Given a task and a robot, the semantic knowledge model provides all the relevant parameters and interdependencies for the robot-task pair.

Then it combines these heterogeneous parameters to calculate a single utility value for the pair. In this process, it also filters the capable robots, i.e., the robots that are capable to perform a particular task. The utility values are stored in a matrix as a robot-task pair. Finally, this matrix is given as an input to a suitable task allocation method for task assignment to capable robots.

It may be understood by a person skilled in the art that the illustrated example pertains to pick and place task, however, the application may be extended to any task using the autonomous, semantic enabled, self-decision making methods and systems of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for dynamic utility calculation (200) comprising the steps of:
    obtaining, by one or more hardware processors, a set of parameters for each robot-task pair to perform a task, given there are n tasks to be performed by k robots (202), wherein the set of parameters are characterized by interdependencies therebetween, with a set of sub-parameters and with the n tasks, and wherein a one-to-many mapping between the set of parameters, the set of sub-parameters and the n tasks is defined in real time in a structured semantic knowledge model; and
    dynamically computing, by the one or more hardware processors, utility $u_{ij}$ for a robot i to perform a task j based on the set of parameters including travel time $t_{ij}^{motion}$ for the robot i and actuation time $t_{ij}^{act}$ for the task j by the robot i, wherein the travel time $t_{ij}^{motion}$ is further based on free motion time $t_{ij}^{free}$ and turning time $t_{ij}^{turn}$, wherein the free motion time $t_{ij}^{free}$ depends on travel distance $d_{ij}^{free}$ and speed of the robot $v_i$ and the turning time $t_{ij}^{turn}$ depends on average turning time $t_i^{turn}$ and number of turns $t_{ij}^{turn}$ the robot's path (204).

2. The processor implemented method of claim 1, wherein the step of dynamically computing utility $u_{ij}$ is based on restrictions or limitations that exist or need to be satisfied based on the structured semantic knowledge model.

3. The processor implemented method of claim 1 further comprising:
    identifying, by the one or more hardware processors, capability of each robot from the k robots to perform the task j based on at least one of the structured semantic knowledge model and the dynamically computed utility (206);
    storing, by the one or more hardware processors, values associated with the utility $u_{ij}$ for each of the k robots along with the identified capability associated thereof in a matrix as the robot-task pair (208);

inputting, by the one or more hardware processors, the matrix to a task allocation method (210); and updating, by the one or more hardware processors, the one-to-many mapping between the set of parameters, the set of sub-parameters and the n tasks based on an output of the task allocation method (212).

4. The processor implemented method of claim 1, wherein the turning time $t_{ij}^{turn}$ represents ascending or descending time to reach a desired flight level if the robot is an unmanned aerial vehicle (UAV).

5. The processor implemented method of claim 1, wherein the step of computing utility $u_{ij}$ for a robot i is further based on a recharge time $t_{ij}^{rec}$ for the robot i.

6. The processor implemented method of claim 5, wherein the recharge time $t_{ij}^{rec}$ is an equivalent time to recharge battery of the robot that is spent to perform the task j and is based on an estimated amount of energy $e_{ij}$ spent by the robot to perform sub-tasks that in combination completes the task j, total time required to recharge the battery fully from a completely drained out state $t_i^{cap}$ and total battery capacity of the robot $e_i^{cap}$.

7. The processor implemented method of claim 6, wherein the amount of energy $e_{ij}$ is based on at least some energy consuming activities including energy spent for movement activities $e_{ij}^{motion}$, energy spent on sensing activities $e_{ij}^{sense}$, energy spent for actuation activities $e_{ij}^{act}$, energy spent on load carrying activities $e_{ij}^{load}$, energy spent on computation activities $e_{ij}^{comp}$, energy spent on communication activities $e_{ij}^{comm}$, and energy spent on miscellaneous activities $e_{ij}^{misc}$, and wherein the estimated energy spent on the energy consuming activities is based on an energy consumption rate associated thereof and time taken for performing the corresponding energy consuming activities.

8. The processor implemented method of claim 1, wherein the structured semantic knowledge model is an ontology created in Web Ontology Language (OWL) with a semantic knowledge repository based on Resource Description Framework (RDF), wherein the semantic knowledge repository has a generic modular structure comprising (i) components and capabilities associated with each of the k robots represented as a robot ontology, (ii) description of objects comprised in an environment under consideration represented as an object ontology and (iii) an environment model corresponding to the environment under consideration represented as an environment ontology, wherein an instance of each of the ontologies is populated corresponding to the environment under consideration.

9. The processor implemented method of claim 1, wherein the step of dynamically computing utility $u_{ij}$ comprises analyzing semantics of the set of parameters, wherein parameters thereof are heterogeneous.

10. A system (100) comprising:
one or more data storage devices (102) operatively coupled to one or more hardware processors (104) and configured to store instructions configured for execution by the one or more hardware processors to:
obtain a set of parameters for each robot-task pair to perform a task, given there are n tasks to be performed by k robots, wherein the set of parameters are characterized by interdependencies therebetween, with a set of sub-parameters and with the n tasks, and wherein a one-to-many mapping between the set of parameters, the set of sub-parameters and the n tasks is defined in real time in a structured semantic knowledge model; and dynamically compute utility $u_{ij}$ for a robot i to perform a task j based on the set of parameters including travel time $t_{ij}^{motion}$ for the robot i and actuation time $t_{ij}^{act}$ for the task j by the robot i, wherein the travel time $t_{ij}^{motion}$ is further based on free motion time $t_{ij}^{free}$ and turning time $t_{ij}^{turn}$, wherein the free motion time $t_{ij}^{free}$ depends on travel distance $d_{ij}^{free}$ and speed of the robot $v_i$ and the turning time $t_{ij}^{turn}$ depends on average turning time $t_i^{turn}$ and number of turns $n_{ij}^{turn}$ on the robot's path.

11. The system of claim 10, wherein the one or more processors are further configured to dynamically compute the utility $u_{ij}$ based on restrictions or limitations that exist or need to be satisfied based on the structured semantic knowledge model.

12. The system of claim 10, wherein the one or more processors are further configured to:
identify capability of each robot from the k robots to perform the task j based on at least one of the structured semantic knowledge model and the dynamically computed utility;
store values associated with the utility $u_{ij}$ for each of the k robots along with the identified capability associated thereof in a matrix as the robot-task pair;
input the matrix to a task allocation method; and
update the one-to-many mapping between the set of parameters, the set of sub-parameters and the n tasks based on an output of the task allocation method.

13. The system of claim 10, wherein the turning time $t_{ij}^{turn}$ represents ascending or descending time to reach a desired flight level if the robot is an unmanned aerial vehicle (UAV).

14. The system of claim 10, wherein the one or more hardware processors are further configured to compute the utility $u_{ij}$ for a robot i further based on a recharge time $t_{ij}^{rec}$ for the robot i.

15. The system of claim 14, wherein the recharge time $t_{ij}^{rec}$ is an equivalent time to recharge battery of the robot that is spent to perform the task j and is based on an estimated amount of energy $e_{ij}$ spent by the robot to perform sub-tasks that in combination completes the task j, total time required to recharge the battery fully from a completely drained out state $t_i^{cap}$ and total battery capacity of the robot $e_i^{cap}$.

16. The system of claim 15, wherein the estimated amount of energy $e_{ij}$ is based on at least some energy consuming activities including energy spent for movement activities $e_{ij}^{motion}$, energy spent on sensing activities $e_{ij}^{sense}$, energy spent for actuation activities $e_{ij}^{act}$, energy spent on load carrying activities $e_{ij}^{load}$, energy spent on computation activities $e_{ij}^{comp}$, energy spent on communication activities $e_{ij}^{comm}$, and energy spent on miscellaneous activities $e_{ij}^{music}$, and wherein the energy spent on the energy consuming activities is based on an energy consumption rate associated thereof and time taken for performing the corresponding energy consuming activities.

17. The system of claim 10, wherein the structured semantic knowledge model is an ontology created in Web Ontology Language (OWL) with a semantic knowledge repository based on Resource Description Framework (RDF), wherein the semantic knowledge repository has a generic modular structure comprising (i) components and capabilities associated with each of the k robots represented as a robot ontology, (ii) description of objects comprised in an environment under consideration represented as an object ontology and (iii) an environment model corresponding to the environment under consideration represented as an environment ontology, wherein an instance of each of the ontologies are populated corresponding to the environment under consideration.

18. The system of claim 10, wherein the one or more hardware processors are further configured to compute the utility $u_{ij}$ by analyzing semantics of the set of parameters, wherein parameters thereof are heterogeneous.

19. A computer program product comprising a non-transitory computer readable medium having a computer readable program embodied therein, wherein the computer readable program, when executed on a computing device, causes the computing device to:

obtain a set of parameters for each robot-task pair to perform a task, given there are n tasks to be performed by k robots, wherein the set of parameters are characterized by interdependencies therebetween, with a set of sub-parameters and with the n tasks, and wherein a one-to-many mapping between the set of parameters, the set of sub-parameters and the n tasks is defined in real time in a structured semantic knowledge model; and dynamically compute utility $u_{ij}$ for a robot i to perform a task j based on the set of parameters including travel time $t_{ij}^{motion}$ for the robot i and actuation time $t_{ij}^{act}$ for the task j by the robot i, wherein the travel time $t_{ij}^{motion}$ is further based on free motion time $t_{ij}^{free}$ and turning time $t_{ij}^{turn}$, wherein the free motion time $t_{ij}^{free}$ depends on travel distance $d_{ij}^{free}$ and speed of the robot $v_i$ and the turning time $t_{ij}^{turn}$ depends on average turning time $t_{ij}^{turn}$ and number of turns $n_{ij}^{turn}$ on the robot's path.

20. The computer program product of claim 19, wherein the computer readable program further causes the computing device to perform one or more of:

identifying capability of each robot from the k robots to perform the task j based on at least one of the structured semantic knowledge model and the dynamically computed utility;

storing values associated with the utility $u_{ij}$ for each of the k robots along with the identified capability associated thereof in a matrix as the robot-task pair;

inputting the matrix to a task allocation method; and updating the one-to-many mapping between the set of parameters, the set of sub-parameters and the n tasks based on an output of the task allocation method.

* * * * *